(12) United States Patent
Blohm et al.

(10) Patent No.: US 11,383,275 B2
(45) Date of Patent: Jul. 12, 2022

(54) TRACKING AND MANAGING MAIL ITEMS USING IMAGE RECOGNITION

(71) Applicants: Nicole Blohm, Mount Pleasant, SC (US); Steve Cousins, Nashville, TN (US)

(72) Inventors: Nicole Blohm, Mount Pleasant, SC (US); Steve Cousins, Nashville, TN (US)

(73) Assignee: RICOH COMPANY, LTD., Tokyo (JP)

( * ) Notice: Subject to any disclaimer, the term of this patent is extended or adjusted under 35 U.S.C. 154(b) by 769 days.

(21) Appl. No.: 16/355,430

(22) Filed: Mar. 15, 2019

(65) Prior Publication Data
US 2020/0290089 A1    Sep. 17, 2020

(51) Int. Cl.
| | |
|---|---|
| B07C 3/00 | (2006.01) |
| B07C 3/14 | (2006.01) |
| H04L 9/32 | (2006.01) |
| B07C 3/20 | (2006.01) |
| B07C 3/18 | (2006.01) |
| G02B 27/01 | (2006.01) |
| G06Q 50/28 | (2012.01) |
| G06Q 10/08 | (2012.01) |
| G06V 20/20 | (2022.01) |
| G06F 1/16 | (2006.01) |

(52) U.S. Cl.
CPC ............ *B07C 3/14* (2013.01); *B07C 3/18* (2013.01); *B07C 3/20* (2013.01); *G02B 27/0172* (2013.01); *G06Q 10/0833* (2013.01); *G06Q 50/28* (2013.01); *G06V 20/20* (2022.01); *H04L 9/3242* (2013.01); *G06F 1/163* (2013.01)

(58) Field of Classification Search
None
See application file for complete search history.

(56) References Cited

U.S. PATENT DOCUMENTS 7,201,316 B2    4/2007  Anderson
8,046,308 B2 *  10/2011 Miette .................. G06Q 10/083
                                                705/401

(Continued)

OTHER PUBLICATIONS

Cousins, U.S. Appl. No. 16/355,413, filed Mar. 15, 2019, Office Action dated Apr. 5, 2021.

(Continued)

*Primary Examiner* — Martin Mushambo
(74) *Attorney, Agent, or Firm* — Hickman Becker Bingham Ledesma LLP; Edward A. Becker (57) ABSTRACT

An approach is provided for tracking and managing physical mail items using image recognition. An image is captured of a mail item and may include any information on the mail item, such as sender information, recipient information, a postmark, a cancellation, as well as artifacts of the mail item, such as seams, markings, coloration, texture, damage, etc. A unique value is generated for the image, for example, by processing the image data for the image using one or more hash functions to generate a hash value. The hash value uniquely identifies the mail item based upon the information included in the image, such as the sender and recipient information, postmark, cancellation, artifacts, etc., and is used to track and manage the mail item.

20 Claims, 6 Drawing Sheets

(56) References Cited

U.S. PATENT DOCUMENTS

| | | | |
|---|---|---|---|
| 8,110,052 B2* | 2/2012 | Olsen | B07C 7/005 |
| | | | 156/64 |
| 10,346,891 B2 | 7/2019 | Amato | |
| 10,366,299 B2* | 7/2019 | Bowne | G06V 10/20 |
| 10,369,597 B2 | 8/2019 | Farlotti | |
| 2001/0032805 A1 | 10/2001 | Lawandy | |
| 2003/0154219 A1* | 8/2003 | Yoshihara | H04L 67/06 |
| | | | 707/999.203 |
| 2004/0182925 A1 | 9/2004 | Anderson | |
| 2005/0141006 A1* | 6/2005 | Aiyama | G06K 15/00 |
| | | | 358/1.15 |
| 2005/0190402 A1* | 9/2005 | Nakamura | H04N 1/32406 |
| | | | 379/100.09 |
| 2005/0195430 A1* | 9/2005 | Shinohara | H04N 1/2191 |
| | | | 358/1.15 |
| 2006/0092462 A1* | 5/2006 | Mokuya | G06F 3/1212 |
| | | | 358/1.15 |
| 2006/0253406 A1 | 11/2006 | Caillon | |
| 2007/0214363 A1* | 9/2007 | Ishii | H04L 9/3297 |
| | | | 713/178 |
| 2007/0273702 A1* | 11/2007 | Ishii | G06F 12/0875 |
| | | | 345/557 |
| 2009/0141934 A1 | 6/2009 | Caillon | |
| 2010/0032805 A1 | 2/2010 | Letertre et al. | |
| 2010/0040256 A1 | 2/2010 | Rundle | |
| 2011/0199478 A1* | 8/2011 | Ito | H04N 7/185 |
| | | | 348/92 |
| 2015/0076043 A1* | 3/2015 | Serjeantson | B07C 7/005 |
| | | | 209/584 |
| 2015/0110343 A1* | 4/2015 | Worth, II | G06V 10/17 |
| | | | 382/101 |
| 2016/0371638 A1 | 12/2016 | Loverich et al. | |
| 2017/0372159 A1 | 12/2017 | Schimmel | |
| 2018/0029083 A1* | 2/2018 | Farlotti | B07C 3/10 |
| 2020/0290091 A1 | 9/2020 | Cousins | |
| 2021/0334749 A1 | 10/2021 | Blohm et al. | |

OTHER PUBLICATIONS

Cousins, U.S. Appl. No. 16/355,413, filed Mar. 15, 2019, Notice of Allowance dated Aug. 4, 2021.
Cousins, U.S. Appl. No. 16/355,413, filed Mar. 15, 2019, Notice of Allowance and Fees Due dated Aug. 4, 2021.
Cousins, U.S. Appl. No. 16/355,413, filed Mar. 15, 2019, Restriction Requirement dated Dec. 7, 2020.
Cousins, U.S. Appl. No. 16/355,426, filed Mar. 15, 2019, Notice of Allowance dated Oct. 3, 2019.
Cousins, U.S. Appl. No. 16/355,421, filed Mar. 15, 2019, Notice of Allowance dated Oct. 4, 2019.

* cited by examiner

| Mail Item Management Data 176 | | | |
|---|---|---|---|
| Hash Value | Image Data | OCR Data | Status History |
| HV1 | IMG1 | OCR1 | SH1 |
| HV2 | IMG2 | OCR2 | SH2 |
| HV3 | IMG3 | OCR3 | SH3 |
| HV4 | IMG4 | OCR4 | SH4 |

FIG. 1C

Mail Item Manager 170
- Mail Item Management Application 172
- OCR Application 174
- Mail Item Management Data 176

TRACKING AND MANAGING MAIL ITEMS USING IMAGE RECOGNITION

RELATED APPLICATION DATA AND CLAIM OF PRIORITY

This application is related to U.S. patent application Ser. No. 16/355,413 entitled "MAIL ITEM SORTING USING AUGMENTED REALITY GLASSES", filed Mar. 15, 2019, and U.S. patent application Ser. No. 16/355,421 entitled "DETERMINING THE POSITION OF A SORT LOCATION FOR AUGMENTED REALITY GLASSES", filed Mar. 15, 2019, and U.S. patent application Ser. No. 16/355,426 entitled "A MAIL ITEM MANAGER FOR SORTING MAIL ITEMS USING AUGMENTED REALITY GLASSES", filed Mar. 15, 2019, the contents all of which are incorporated by reference in their entirety for all purposes as if fully set forth herein.

FIELD

The technical field of the present disclosure relates to improved methods, systems, computer software, and/or computer hardware in the field of tracking and managing physical mail items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Conventional approaches for tracking and managing physical mail items rely upon attaching identifying information, such as a label, bar code, QR code, RFID tag, or the like, to physical mail items. For example, a mail service provider may attach a label with a bar code to a package. The bar code is a machine-readable representation of a number, often referred to as a tracking number, that uniquely identifies the package. The bar code is scanned by the mail service provider at different points in the delivery process to allow the package to be tracked. For example, the bar code may be first scanned when the package is picked up by the mail service provider, scanned again at various points along the delivery path, and scanned a last time when the package is delivered to the customer. Each time the bar code is scanned, the tracking number, a time stamp, and other information is stored by the mail service, for example, in a database management system. The stored information allows the mail service provider and customers to track the package throughout the entire delivery process.

One of the issues with the aforementioned approaches for tracking and managing physical mail items is that they require adding identifying information to a physical mail item so that the physical mail item can be uniquely identified. This is labor intensive and prone to error, especially for mail service providers that handle a large number of physical mail items. In addition, identifying information is subject to damage and being separated from a physical mail item. For example, a label may be damaged and/or separated from a package during handling or transit, rendering the identifying information useless and requiring special manual processing of the package.

SUMMARY

A client computing device comprises an image capture component configured to capture an image of a physical mail item and generate image data that represents the physical mail item. The client computing device also includes one or more processors and one or more memories communicatively coupled to the one or more processors and storing instructions which, when processed by the one or more processors, cause processing the image data that represents the physical mail item using one or more hash functions to generate a hash value. Processing of the instructions also causes generating and transmitting, via one or more computer networks to a mail item management process, the hash value, the image data, and status data that specifies a current processing status for the physical mail item to allow the mail item management process to track and manage the physical mail item.

A computing device comprises one or more processors and one or more memories communicatively coupled to the one or more processors and storing instructions. Processing of the instructions by the one or more processors causes receiving, from a first client device, first image data captured by the first client device of a physical mail item, a first hash value generated by the first client device from the first image data of the physical mail item, and first status data that specifies a first status of the physical mail item represented in the first image data. A new entry in mail item management data for the physical mail item is generated, wherein the new entry includes the first hash value generated by the first client device from the first image data, the first image data, and the first status data that specifies the first status of the physical mail item represented in the first image data. A second hash value is received from a second client device that is different than the first client device. The second hash value is generated by the second client device from second image data acquired by the second client device of the physical mail item. Second status data specifies a second status of the physical mail item represented in the second image data, wherein the physical mail item is represented in both the first image data and the second image data. A determination is made whether the second hash value generated by the second client device from the second image data acquired by the second client device is the same as the first hash value generated by the first client device from the first image data. In response to determining that the second hash value generated by the second client device from second image data acquired by the second client device is the same as the first hash value generated by the first client device from the first image data, the new entry in the mail item management data for the physical mail item is updated to include the second status data that specifies the second status of the physical mail item. The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.
 I. Overview
 II. Mail Item Tracking and Management Architecture
   A. Client Devices
   B. Mail Item Manager
 III. Mail Item Tracking and Management
 IV. Implementation Examples I. Overview An approach is provided for tracking and managing physical mail items using image recognition. As used herein, the terms "physical mail item" and "mail item" refer to any physical item that may be mailed. Examples include, without limitation, cards, envelopes, packages, items of commerce, etc. Embodiments are applicable to any type of mail service, including government-based mail services and private mail services.

According to the approach, an image is captured of a mail item. The image may include one or more portions of the mail item, or the entire mail item, from any angle. The image may include any information on the mail item, such as sender information, recipient information, a postmark, a cancellation, as well as artifacts of the mail item, such as seams, markings, coloration, texture, damage, etc. A unique value is generated for the image, for example, by processing the image data for the image using one or more hash functions to generate a hash value. The hash value uniquely identifies the mail item based upon the information included in the image, such as the sender and recipient information, postmark, cancellation, artifacts, etc., and is used to track and manage the mail item. For example, a computer-implemented mail item manager may use the hash value to track the mail item throughout a delivery process. This approach allows "touchless" tracking and management of mail items that avoids having to attach, to mail items, identifying information, such as a label, bar code, QR code, RFID tag, etc. This makes the approach less labor intensive than conventional approaches and improves reliability by not relying upon identifying information that might become detached from mail items. The approach may be used instead of, or in addition to, approaches that add identifying information to mail items.

II. Mail Item Tracking and Management Architecture

Figure 1A:
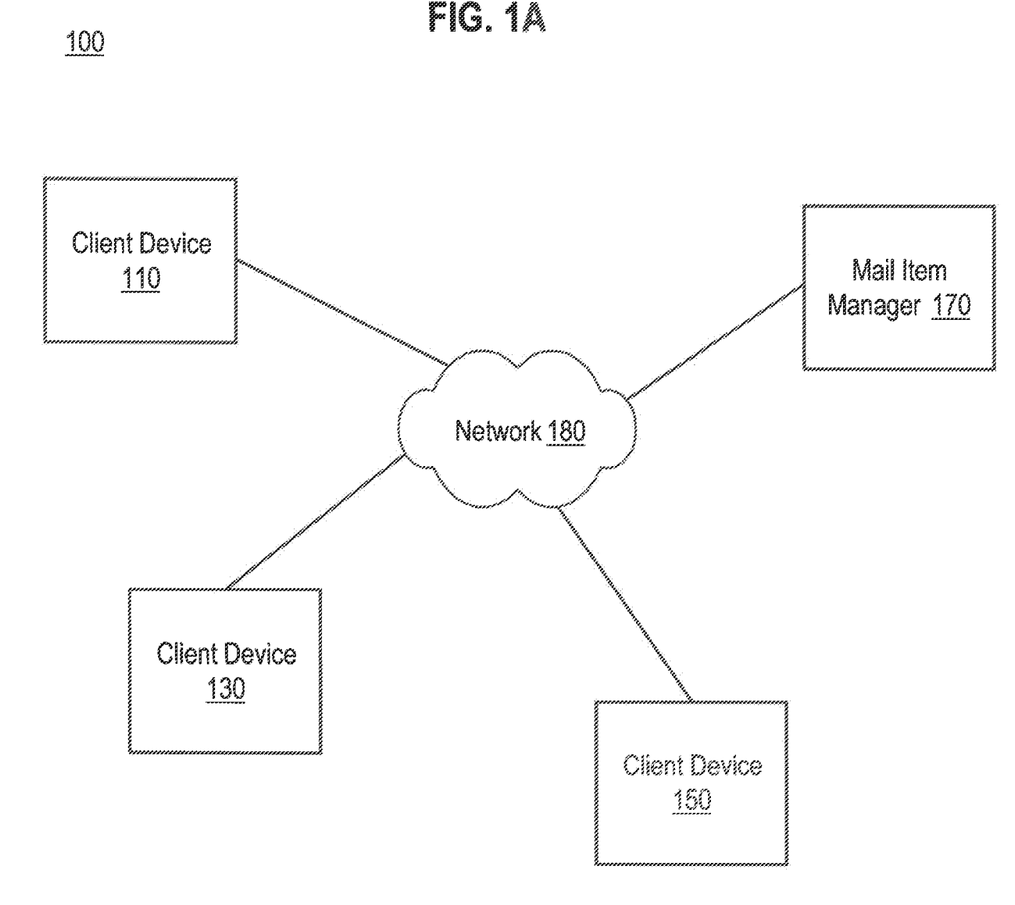
FIG. 1A is a block diagram that depicts an arrangement for tracking and managing mail items using image recognition.

FIG. 1A is a block diagram that depicts an arrangement 100 for tracking and managing mail items using image recognition. Arrangement 100 includes client devices 110, 130, 150, also referred to herein as "client computing devices," and a mail item manager 170 communicatively coupled via a network 180. Although network 180 is depicted and described herein in the context of a single network, network 180 may be implemented by one or more wireless and/or wired computer networks of any type. In addition, the elements depicted in FIG. 1A may have direct communications links.
 A. Client Devices Client devices 110, 130, 150 may be any type of client device and embodiments are not limited to any particular type of client device. Examples of client devices 110, 130, 150 include, without limitation, smart phones, laptop computers, desktop computers, tablet computing devices, handheld computing devices, mail sorting and/or routing devices, other mail processing devices, etc. Client devices 110, 130, 150 may be carried by a human, for example, a sender of mail items, a mail item delivery person, and/or located at various points along a delivery path, such as at the sender's location, in a delivery vehicle, at an entrance and exit to a mail processing facility, and within a mail processing facility, for example, at various sort points, storage locations, etc.

Figure 1B:
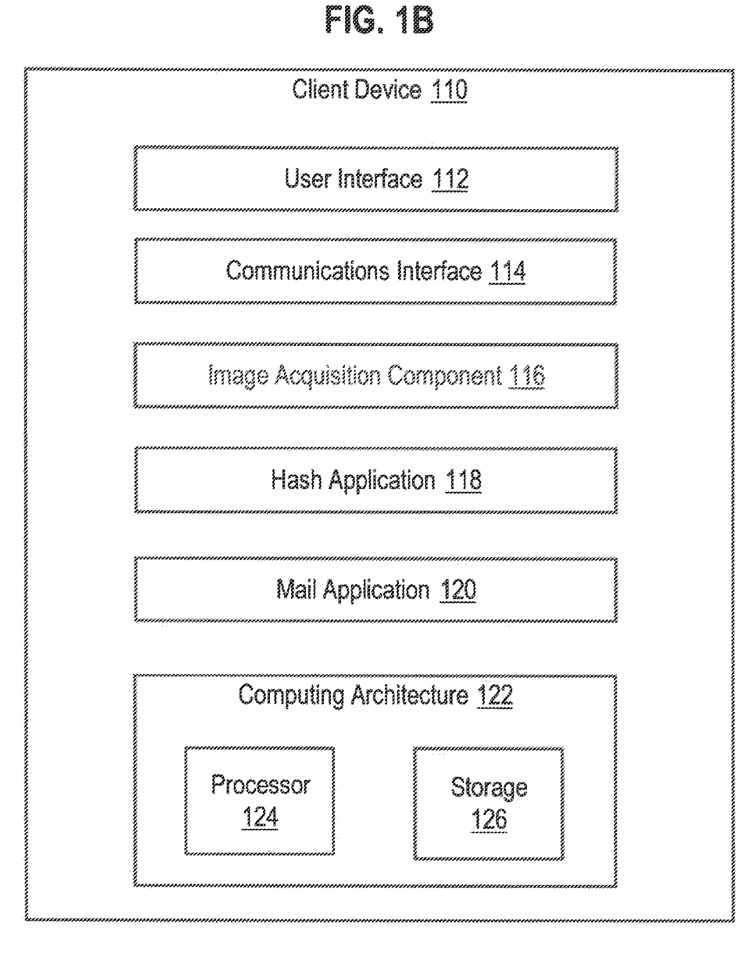
FIG. 1B is a block diagram that depicts an example embodiment of a client device.

FIG. 1B is a block diagram that depicts an example embodiment of client device 110 that includes a user interface 112, a communications interface 114, an image acquisition component 116, a hash application 118, a mail application 120 and a computing architecture that includes a processor 124 and storage 126. Embodiments of client device 110 are not limited to the example depicted in FIG. 1B and client device 110 may have fewer elements or additional elements, depending upon a particular implementation. The example embodiment depicted in FIG. 1B is applicable to client devices 130, 150.

User interface 112 allows the client device to receive user input, display information to a user, or both receive user input and display information to a user. Examples of user interface 112 include, without limitation, a screen, touchscreen, and/or other user interface controls. Communications interface 114 allows client device 110 to communicate with other devices over network 180 and may be implemented by one or more wireless and/or wired computer communications interfaces.

Image acquisition component 116 acquires images of mail items and generates image data that represents the images. Image acquisition component 116 may include, for example, one or more cameras and associated computer hardware and/or computer software or firmware.

Hash application 118 is a process configured to process image data for an image of a mail item and generate a hash value that uniquely identifies the image and the mail item. Hash application 118 may implement one or more hash functions of any type. Alternatively, hash application 118 may invoke one or more external hash functions, for example, by issuing one or more commands to a hash function library via an Application Program Interface (API) of the hash function library. Embodiments are applicable to any type of hash function. Example hash functions include, without limitation, MD5, SHA-1, and SHA-2.

Figure 1C:
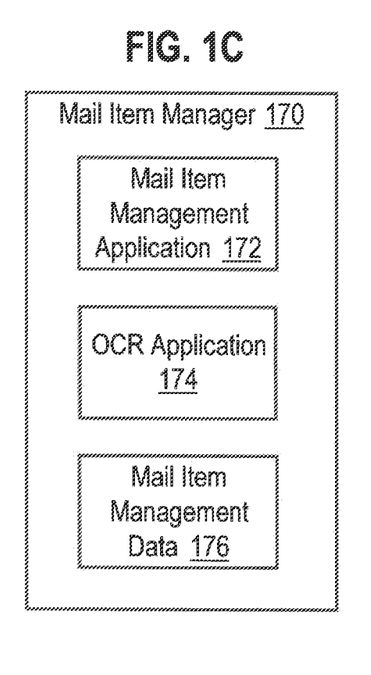
FIG. 1C is a block diagram that depicts an example embodiment of mail item manager.

Mail application 120 is a process for acquiring images of mail items, generating a hash value for each of the images, and transmitting the images, the hash values, and status data to mail item management application 172, also referred to herein as a "mail item management process," on mail item manager 170. For example, mail application 120 may instruct image acquisition component 116 to acquire an image of a mail item and generate image data, instruct hash application 118 to generate a hash value for the image, and cause the hash value, image data, and other information, such as a time stamp and status data, to be transmitted to mail item management application 172. Mail application 120 may also cause the hash value, image data, and other information to be stored locally in storage 126.

Mail application 120 may provide a graphical user interface with controls that allows a user to initiate these functions. For example, the graphical user interface may include a control that allows a user to capture an image of a mail item and generate image data, generate a hash value that uniquely represents the image, and transmit the hash value, image data, and other information to mail item management application 172. Mail application 120 may also be configured to perform these functions in response to a signal. For example, client device 110 may be implemented at a mail processing facility that generates a signal when a mail item is in position within the capture area of image acquisition component 116. Mail application 120 performs the aforementioned functions in response to receiving the signal.

Processor 124 may be one or more computer processors that are capable of executing instructions stored in storage 126. Storage 126 may be implemented by volatile storage, non-volatile storage, or any combination of volatile and non-volatile storage.

B. Mail item manager

Mail item manager 170 is an entity that tracks and manages mail items using image recognition, as described herein. This includes tracking and managing mail items using hash values determined for mail items based upon information received from client devices 110, 130, 150. FIG. 1C is a block diagram that depicts an example embodiment of mail item manager 170 and includes a mail item management application 172, also referred to herein as a mail item management process, an OCR application 174, and mail item management data 176. Mail item manager 170 may include other elements that may vary depending upon a particular implementation. For example, mail item manager 170 may include one or more processors, one or more memories, one or more communications interfaces, etc., that are not depicted in FIG. 1C for purposes of explanation. Mail item management application 172 may be implemented by one or more processes for tracking and managing mail items using hash values of images as described in more detail hereinafter. Mail item management application 172 may support an API that provides access to functionality of mail item management application 172. For example, the API may support commands that may be used by client devices 110, 130, 150 to provide information to mail item management application 172, such as hash values, image data, status information, etc., as described in more detail hereinafter. The API may also provide access to information stored and managed by mail item management application 172.

OCR application 174 processes image data and generates OCR data that includes text identified in the image data. OCR application 174 may itself implement OCR functionality that recognizes text in image data, or OCR application 174 may invoke OCR functionality that is external to OCR application 174, for example, by making calls to external OCR services. OCR application 174 may be implemented by one or more processes executing on mail item manager 170.

Figure 1D:
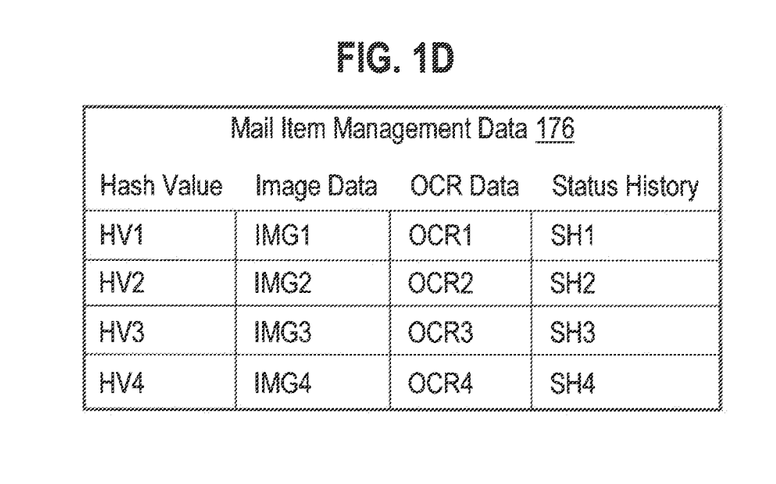
FIG. 1D depicts an example embodiment of mail item management data in the form of a table, where each row of the table corresponds to a mail item and includes a hash value, image data, and status history.

Mail item management data 176 is used to track and manage a plurality of mail items. FIG. 1D depicts an example embodiment of mail item management data 176 in the form of a table, where each row of the table corresponds to a mail item and includes a hash value, image data, OCR data, and status history.

The hash value uniquely identifies a particular mail item and thereby provides accountability that can be used to comply with certain requirements, such as regulatory and legal requirements, etc. The hash value is generated by one or more hash functions, such as MD5, SHA-1, and SHA-2, etc., and may be for example, a hexadecimal number, a number, etc., of any length that may vary depending upon the particular hash function used. In the example depicted in FIG. 1D, the hash values are indicated as HV1-HV4 for purposes of explanation.

The image data represents an image of a mail item captured by a client device. The image data may be any type of image data that may vary depending upon a particular implementation and embodiments are not limited to any particular type or size of image data. Example image data formats include, without limitation, JPEG, Exif, TIFF, GIF, BMP, PNG, BAT, and BPG, but embodiments are not limited to these examples. The entries in mail item management data 176 may contain the actual image data for a mail item or a reference to image data. For example, image data may be stored external to mail item manager 170 and each image data entry includes a reference to corresponding image data stored at an external location, for example, at a server, cloud storage, etc. In the example depicted in FIG. 1D, the image data values are indicated as IMG1-IMG4 for purposes of explanation.

OCR data includes text identified in corresponding image data by OCR functionality. Example text includes, without limitation, recipient information and sender information for a mail item. Text may be stored as a list of text items separated by a delimiter, such as a comma, semicolon, etc. In the example depicted in FIG. 1D, the OCR data values are indicated as OCR1-OCR4 for purposes of explanation.

The status history includes status information for the mail item over time and may specify, for example, a date and time, a location, such as a current or last known location of a mail item, e.g., on a delivery truck or in a particular location of a mail item processing facility, and one or more actions performed on a mail item. For example, the status may specify that at a particular date and time, a mail item was delivered to a particular location. In the example depicted in FIG. 1D, the status history data values are indicated as SH1-SH4 for purposes of explanation. An example status history is "12/10/18 13:10 LOC1; 12/10/18 14:27 LOC2; 12/10/18 18:30 LOC3." This example status history includes three entries separated by commas, where each entry specifies a date, a time, and a location, i.e., LOC1, LOC2, LOC3, along a delivery path where an action was performed with respect to the mail item. The action may be any type of action, such as receiving, sorting, a checkpoint, delivering, etc. In this manner, the status history specifies a sequence of actions performed with respect to a mail item over time and may be used to manage mail items. For example, the status history for mail items may be used to identify the current location and status of a mail item. As another example, the status history, and in particular the date, time, and location information, may be used to analyze and improve mail item processing within an organization. Embodiments are not limited to the particular example depicted in FIG. 1D and mail item management data 176 may include other information that varies depending upon a particular implementation. As one example, mail item management data 176 may store the image data, or a link to the image data, for mail items.

Mail item manager 170 may support an API that client devices 110, 130, 150 use to communicate with and invoke functionality on mail item manager 170. For example, the API allows client devices 110, 130, 150 to send hash values and status information to mail item manager 170. The API may also allow a client device to access mail item management data 176. For example, the API may provide access to a graphical user interface, such as a Web-based graphical user interface, to view and manage mail item management data 176.

III. Mail Item Tracking and Management

Figure 2:
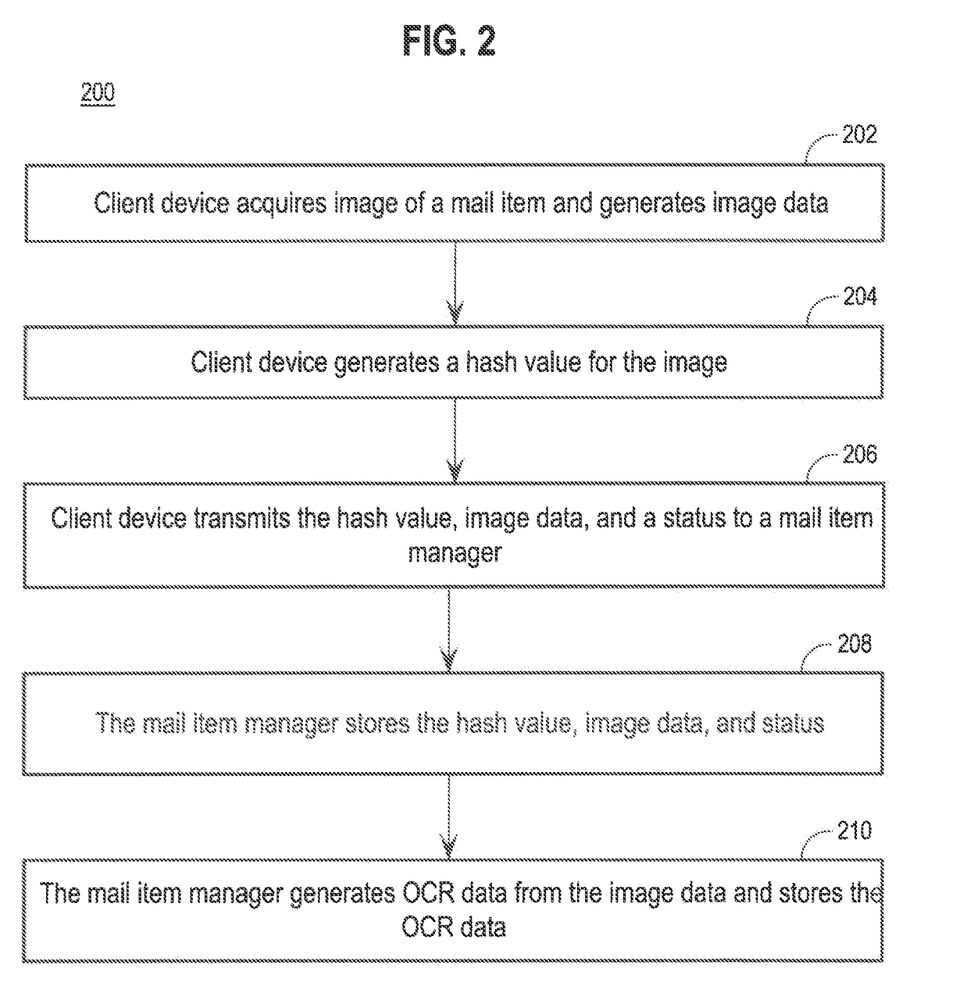
FIG. 2 is a flow diagram that depicts an approach for tracking and managing mail items using image recognition according to an embodiment.

FIG. 2 is a flow diagram 200 that depicts an approach for tracking and managing mail items using image recognition according to an embodiment. In step 202, a client device acquires an image of a mail item and generates image data. For example, mail application 120 may display a graphical user interface that includes controls for capturing an image of a mail item. A user of client device 110 selects one or more of the controls and in response to the selection, mail application 120 causes image acquisition component 116 to capture an image of the mail item and generate image data for the image. Alternatively, as previously described herein, mail application 120 may automatically capture an image of a mail item in response to a signal that indicates that a mail item is within the capture area of image acquisition component 116. One or more portions of a mail item, including an entire mail item, may be captured from any angle or view. Mail application 120 may cause the image data to be stored in storage 126.

Figure 3A:
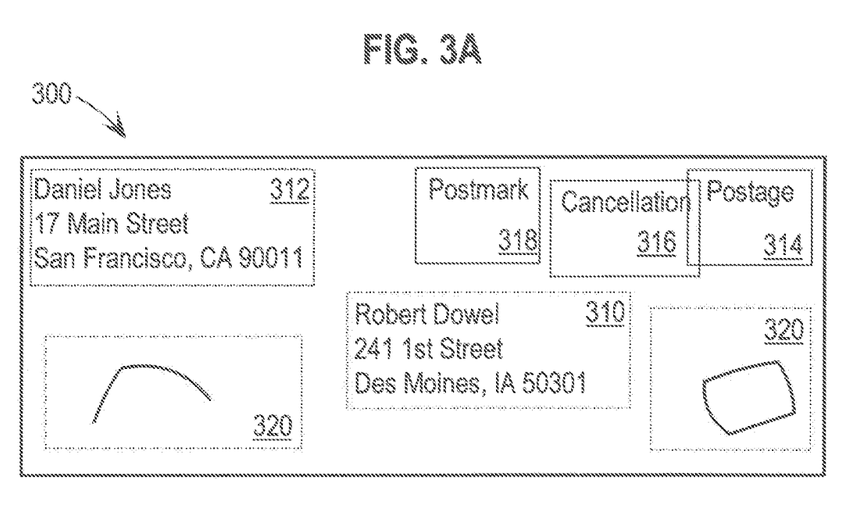
FIG. 3A depicts an example mail item in the form of a card or envelope that includes several features and artifacts.

FIG. 3A depicts an example mail item 300 in the form of a card or envelope that includes several features and artifacts. In this example, mail item 300 includes a recipient address 310 and a sender address 312 that each may be applied directly to mail item 300 or to a label that is applied to mail item 300. Mail item 300 also includes postage 314, a cancellation 316 that overlaps at least a portion of postage 314, and a postmark 318. Mail item 300 further includes two artifacts 320 that may represent, for example, marks, such as scuff marks, transportation marks etc., seams, folds, damage, etc., on mail item 300.

Figure 3B:
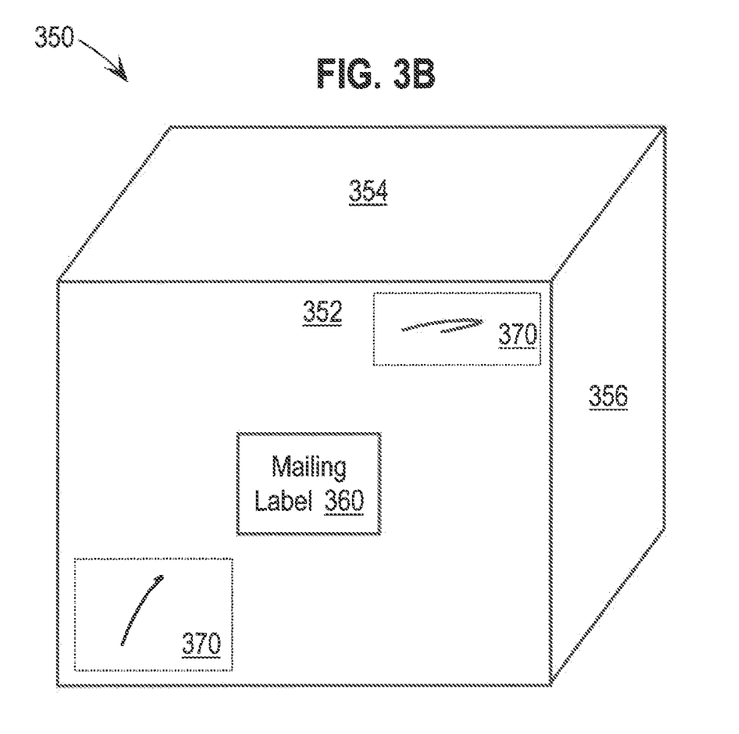
FIG. 3B depicts an example mail item in the form of a package or an item of commerce that includes a mailing label.

FIG. 3B depicts an example mail item 350 in the form of a package or an item of commerce that includes a mailing label 360. Mail item 350 is depicted in the shape of a cube for purposes of explanation only and mail item 350 may be any shape or size. Mail item 350 includes a front face 352, a top face 354, and a side face 356. Mail item 350 includes another side face, a rear face, and a bottom face that are not depicted in FIG. 3B. Mailing label 360 includes a recipient address and a sender address and may include other features, such as postage, a cancellation, and a postmark, etc. In the example depicted in FIG. 3B, mail item 350 also includes artifacts 370 on front face 352 that may be, for example, marks such as scuff marks, transportation marks, seams, folds, damage, etc.

In step 202 when the image of a mail item is captured, the image may include mailing information, for example a recipient address 310, a sender address 312, and information on mailing label 360. The image may also include other information on the mail item previously mentioned, such as postage 314, cancellation 316, postmark 318, artifacts 320, 370, labels, tracking numbers, bar codes, QR codes, etc.

In step 204, the client device generates a hash value for the acquired image. For example, mail application 120 may use hash application 118 to generate a hash value for the image by processing the image data using one or more hash functions that are implemented by hash application 118 or that are external to hash application 118. Because the image includes mailing information, other information and artifacts, the hash value uniquely identifies the mail item and provides a way to account for the mail item without having to attach identifying information to the mail item. For example, two mail items that have similar mailing labels, and even similar information on the mailing labels, may nonetheless be distinguished by other features, such as artifacts that are unique to each mail item. Hash values may be stored in storage 126.

In step 206, the client device sends the hash value for the image, the image data, and status data to mail item management application 172. For example, mail application 120 may generate and transmit a message containing the hash value, the image data or a link to the image data, and status data to mail item management application 172. The message may be in any format and may conform to an API supported by mail item management application 172. The status data specifies a status for the mail item and may include, for example, date and time information, a location, and/or one or more actions performed with respect to the mail item.

In step 208, the mail item management application 172 stores the received hash value, image data, and status. For example, mail item management application 172 extracts the hash value, image data, and status from the message received from client device 110 and stores this information in mail item management data 176. This may include mail item management application 172 determining whether a current entry exists in mail item management data 176 for the mail item by determining whether there is a current entry with a hash value that is the same as the hash value extracted from the message. For example, suppose that the hash value extracted from the message is HV2. Referring to FIG. 1D, mail item management application 172 examines the hash values stored in mail item management data 176 to determine whether an entry has the hash value HV2. Alternatively, mail item management application 172 may examine an index for the hash value HV2 to determine whether mail item management data 176 includes an entry for the mail item. In the present example, since the hash value HV2 exists in mail item management data 176, then an entry has already been created for the mail item and mail item management application 172 updates the status history for the mail item. This may include replacing the status in the status data with the status extracted from the message, or appending the status extracted from the message to the status data already stored in the entry.

If an entry for the received hash value does not exist in mail item management data 176, then mail item management data 176 creates a new entry for the mail item in mail item management data 176 and stores the hash value, image data, and status in the new entry. For example, the first time that a mail item is processed by a client device, e.g., when first processed by a sender or at a mail service provider, a new entry is created in mail item management data 176.

There may be situations where mail item management data 176 includes multiple entries, i.e., for different mail items, with the same hash value. This may occur, for example, if the images for multiple mail items are so similar that the resulting hash values are the same. For example, two mail items may have a very similar mailing label and no other distinguishing features, e.g., such as artifacts. According to an embodiment, in response to determining that mail item management data 176 includes multiple entries, i.e., for different mail items, with the same hash value, mail item manager 170 provides a notification to allow manual resolution. For example, mail item manager 170 may generate and display a notification on a user interface of mail item manger 170, generate and transmit a notification to an administrative user e.g., via email, messaging, etc. In response to a notification, a user may manually inspect the image data for the entries with the same hash value and take corrective action, such as changing the image and/or hash value for one or more of the entries.

In step 210, the mail item manager optionally generates OCR data from the image data and stores the OCR data. The OCR data may include any text information included in the image of the mail item, such as a recipient address, sender address, etc., and the text information may be used by mail item manager 170 and/or other services, such as third-party services, to track and manage mail items. For example, the OCR data may be used to enforce any type of policies, legal requirements, or regulatory requirements. Mail item management application 172 may use its own OCR functionality to generate OCR data from the image data or invoke OCR functionality external to mail item management application 172, for example, by making one or more calls to an external OCR library, service, application, etc., and then store the OCR data in the entry for the mail item in mail item management data 176.

Since the hash value for any particular mail item does not change over time, the process in steps 202-210 may be repeated any number of times as mail items progress along a delivery path, for example, from pickup to final delivery. Although step 206 of the example depicted in FIG. 2 includes the client device transmitting the image data to mail item manager 170, this is not required in every instance. For example, once the image data for a mail item has been provided by a client device to mail item manager 170, the image data does not need to again be supplied to mail item manager 170, either by the same client device or any other client device. This may be accomplished in various ways. In arrangements where a particular client device is the first client device in a delivery process to capture images of mail items, only the particular client device needs to transmit the image data to mail item manager 170, while other client devices only need to send the hash value and status data. The particular client device may be the first client device in a delivery path, for example, when mail items are first acquired for delivery, or the first client device to process mail items within a mail facility.

In other situations, mail item management application 172 may support a command that allows client devices to query whether mail item management data 176 includes data for a particular mail item. For example, the API of mail item management application 172 may include support for a status check command. A client device issues, to mail item management application 172, a status check command with a hash value. Mail item management application 172 checks whether the mail item management data 176 includes an entry with the hash value and returns a result that indicates whether mail item management data 176 includes an entry for the particular hash value. If mail item management data 176 does include an entry for the particular hash value, then the client device does not need to send the image data to mail item management application 172 because the image data has already been supplied by another client device. If mail item management data 176 does not include an entry for the particular hash value, then the client device knows that mail item management data 176 does not include an entry for the particular hash value and so the client device sends the image data, along with the hash value and status data, to mail item management application 172.

The aforementioned approach provides a lightweight solution for tracking mail items that reduces the amount of data transmitted over network 180 and improves the functioning of computing devices in arrangement 100. More specifically, the hash value and status provided by client devices to mail item manager 170 may be implemented in a manner to require a very small amount of data. For example, the hash value may be a single number and the status may be a text string. Alternatively, the status may be implemented by a short alphanumeric code that corresponds to a status. For example, a mail service provider may establish a set of statuses and corresponding alphanumeric status codes that are known to client devices and a mail item manager of the mail service provider. Once any client device has provided the image data for a mail item to mail item manager 170, client devices only need to report the hash value, timestamp information, and a status code to the mail item manager to allow mail item manager 170 to track and manage mail items.

In situations where the amount of data transferred between client devices and the mail item manager is not a concern, and where client devices do not have the capability to generate a hash value for an image, or where it is desirable for the client devices to reduce the computational load on the client devices, client devices may transmit image data to mail item manager 170 and mail item manager 170 generates the hash values for the image data. For example, client device 110 transmits image data, or a link to image data, along with time stamp data and status data to mail item manager 170. Mail item manager 170 generates a hash value for the image, either by a hash application implemented on mail item manager, or via external hash functions. This reduces the computational burden on client devices at the expense of an increased amount of data transmitted from client devices to the mail item manager.

After the received hash value and status are stored in step 208, mail item management data 176 may be used by various processes. For example, as previously described herein, mail item management application 172 may provide a user interface for viewing mail item management data 176 for tracking and management purposes. Mail item management data 176 may also be accessed and used by other "downstream" processes that may include any type of process for tracking and managing mail items. As one example, the mail item management data 176 may be used to locate mail items for delivery, further processing, destruction, etc. According to an embodiment, the approach described herein may be used to register a mail item for outbound delivery prior to the start of actual delivery. For example, mail item manager 170 may support a registration function that allows a client device to supply a hash value, image data, and status to mail item manager 170 to create a record in mail item management data 176. The registration function may also trigger a notification to an organization, such as the sender, a third-party mail service, etc., to indicate that the mail item is ready for pickup. The notification may include the hash value and other information, such as the current location, etc. This allows senders to track mail items throughout the entire delivery lifecycle, from registration, to pickup, during transit, and finally to delivery.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
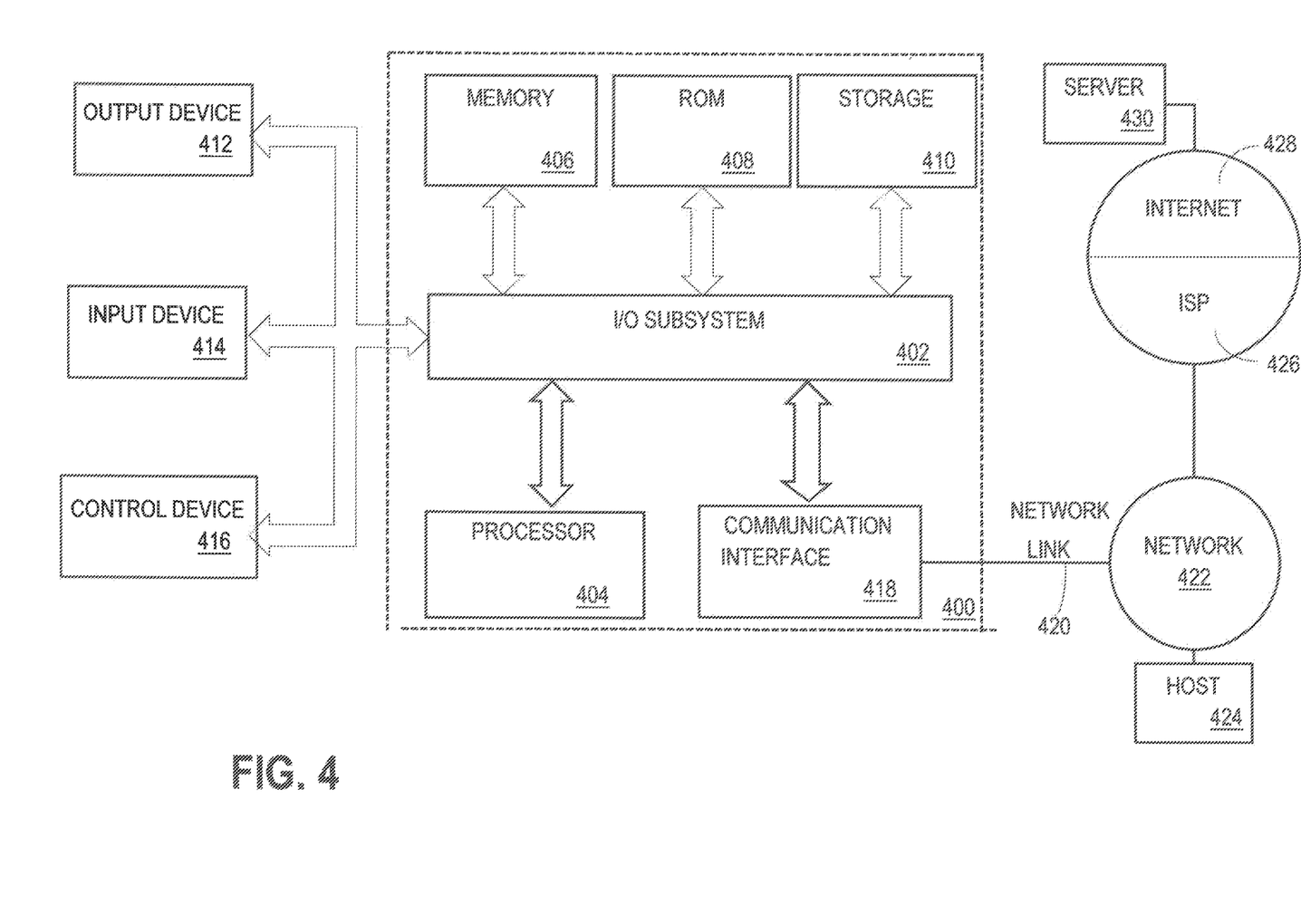
FIG. 4 is a block diagram that depicts an example computer system upon which embodiments may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A client computing device comprising:
   an image capture component configured to capture an image of a physical mail item and generate image data that represents the physical mail item;
   one or more processors;
   one or more memories communicatively coupled to the one or more processors and storing instructions which, when processed by the one or more processors, cause:
   processing the image data that represents the physical mail item using one or more hash functions to generate a hash value,
   generating and transmitting, via one or more computer networks to a mail item management process, the hash value, the image data, and status data that specifies a current processing status for the physical mail item to allow the mail item management process to track and manage the physical mail item.

2. The client computing device as recited in claim 1, wherein the status data includes one or more of a location of the physical mail item or one or more actions performed with respect to the physical mail item.

3. The client computing device as recited in claim 2, wherein the one or more actions performed with respect to the physical mail item include one or more of sorting the physical mail item, routing the physical mail item, or storing the physical mail item.

4. The client computing device as recited in claim 1, wherein the physical mail item includes one or more of a mail envelope, a package, or an item of commerce.

5. The client computing device as recited in claim 1, wherein the physical mail item includes a mailing label that is included in the image of the physical mail item, and the hash value is based, at least in part, on the mailing label included in the image of the physical mail item.

6. The client computing device as recited in claim 1, wherein the physical mail item includes one or more artifacts that are included in the image of the physical mail item, and the hash value is based, at least in part, on the one or more artifacts that are included in the image of the physical mail item.

7. The client computing device as recited in claim 1, wherein the one or more hash functions are implemented on the client computing device.

8. One or more non-transitory computer-readable media storing instructions which, when processed by one or more processors, cause:
   capturing, by a client computing device, an image of a physical mail item and generating image data that represents the physical mail item;
   processing, by a client computing device, the image data that represents the physical mail item using one or more hash functions to generate a hash value; and
   generating and transmitting, by a client computing device, via one or more computer networks to a mail item management process, the hash value, the image data, and status data that specifies a current processing status for the physical mail item to allow the mail item management process to track and manage the physical mail item.

9. The one or more non-transitory computer-readable media as recited in claim 8, wherein the status data includes one or more of a location of the physical mail item or one or more actions performed with respect to the physical mail item.

10. The one or more non-transitory computer-readable media as recited in claim 9, wherein the one or more actions performed with respect to the physical mail item include one or more of sorting the physical mail item, routing the physical mail item, or storing the physical mail item.

11. The one or more non-transitory computer-readable media as recited in claim 8, wherein the physical mail item includes one or more of a mail envelope, a package, or an item of commerce.

12. The one or more non-transitory computer-readable media as recited in claim 8, wherein the physical mail item includes a mailing label that is included in the image of the physical mail item, and the hash value is based, at least in part, on the mailing label included in the image of the physical mail item.

13. The one or more non-transitory computer-readable media as recited in claim 8, wherein the physical mail item includes one or more artifacts that are included in the image of the physical mail item, and the hash value is based, at least in part, on the one or more artifacts that are included in the image of the physical mail item.

14. The one or more non-transitory computer-readable media as recited in claim 8, wherein the one or more hash functions are implemented on the client computing device.

15. A computing device comprising:
   one or more processors;
   one or more memories communicatively coupled to the one or more processors and storing instructions which, when processed by the one or more processors, cause:
      receiving, from a first client device, first image data captured by the first client device of a physical mail item, a first hash value generated by the first client device from the first image data of the physical mail item, and first status data that specifies a first status of the physical mail item represented in the first image data,
      generating a new entry in mail item management data for the physical mail item, wherein the new entry includes the first hash value generated by the first client device from the first image data, the first image data, and the first status data that specifies the first status of the physical mail item represented in the first image data,
      receiving, from a second client device that is different than the first client device, a second hash value generated by the second client device from second image data acquired by the second client device of the physical mail item and second status data that specifies a second status of the physical mail item represented in the second image data, wherein the physical mail item is represented in both the first image data and the second image data,
      determining whether the second hash value generated by the second client device from the second image data acquired by the second client device of the physical mail item is the same as the first hash value generated by the first client device from the first image data and stored in the new entry in the mail item management data for the mail item,
      in response to determining that the second hash value generated by the second client device from second image data acquired by the second client device is the same as the first hash value generated by the first client device from the first image data and stored in the new entry in the mail item management data for the physical mail item, updating the new entry in the mail item management data for the physical mail item to include the second status data that specifies the second status of the physical mail item.

16. The computing device as recited in claim 15, wherein the one or more memories store additional instructions which, when processed by the one or more processors, cause:
   determining whether the mail item management data includes an entry with a hash value that matches the first hash value, and
   the generating a new entry in mail item management data for the physical mail item is performed in response to determining that the mail item management data does not include an entry with a hash value that matches the first hash value.

17. The computing device as recited in claim 15, wherein the physical mail item includes one or more artifacts that are included in the image of the physical mail item, and the hash value is based, at least in part, on the one or more artifacts that are included in the image of the physical mail item.

18. The computing device as recited in claim 15, wherein the status data includes one or more of a location of the physical mail item or one or more actions performed with respect to the physical mail item.

19. The computing device as recited in claim 18, wherein the one or more actions performed with respect to the physical mail item include one or more of sorting the physical mail item, routing the physical mail item, or storing the physical mail item.

20. The computing device as recited in claim 15, wherein the physical mail item includes one or more of a mail envelope, a package, or an item of commerce.

* * * * *